United States Patent [19]

Abraham

[11] 4,172,017

[45] Oct. 23, 1979

[54] PROCESS FOR PRODUCING CHLORINE FROM AMMONIUM CHLORIDE

[76] Inventor: Bernard M. Abraham, 1131 N. Oak Park Ave., Oak Park, Ill. 60302

[21] Appl. No.: 845,909

[22] Filed: Oct. 27, 1977

[51] Int. Cl.$^2$ .......................... C25C 3/00; C01C 1/02; C01B 7/00; C01D 17/00

[52] U.S. Cl. .................................. 204/60; 423/356; 423/427; 423/423; 423/507; 423/648 R; 204/64 R; 204/66

[58] Field of Search ............... 423/189, 190, 422, 423, 423/424, 494, 507, 356, 210.5, 240 R, 240 S, 241; 204/64 R, 66, 60

[56] References Cited

U.S. PATENT DOCUMENTS

| | | | |
|---|---|---|---|
| 379,488 | 3/1888 | Mond | 423/356 |
| 529,130 | 11/1894 | Mond | 423/507 |
| 663,089 | 12/1900 | Naet | 423/356 |
| 1,118,332 | 11/1914 | Clemm | 423/356 |
| 1,398,135 | 11/1921 | Lichtenhahn | 423/422 |
| 3,135,584 | 6/1964 | Brooks | 423/507 |
| 3,792,153 | 2/1974 | Lynn et al. | 423/427 |
| 3,929,964 | 12/1975 | Thoma | 423/428 |
| 3,962,050 | 6/1976 | Shanks et al. | 204/66 |

FOREIGN PATENT DOCUMENTS

| | | | |
|---|---|---|---|
| 46-6485 | 2/1971 | Japan | 204/60 |
| 15649 | of 1889 | United Kingdom | 423/256 |

*Primary Examiner*—G. O. Peters
*Assistant Examiner*—Gary P. Straub
*Attorney, Agent, or Firm*—Keil & Witherspoon

[57] ABSTRACT

A process for producing chlorine from ammonium chloride which comprises vaporizing ammonium chloride, contacting the vapors with a metal selected from the group consisting of tin, zinc and cadmium whereby a metal chloride is formed and then electrolyzing the metal chloride in the presence of a fused salt electrolyte. The ammonium chloride is preferably obtained from the Solvay soda ash process and the process for producing chlorine is integrated with the Solvay process. The integrated process produces chlorine at a substantial energy savings and without calcium chloride being produced as a by-product.

21 Claims, No Drawings

PROCESS FOR PRODUCING CHLORINE FROM AMMONIUM CHLORIDE

BACKGROUND OF THE INVENTION

1. Field of the Invention

The present invention relates to a process for producing chlorine from ammonium chloride and in particular relates to an integrated process for producing chlorine and sodium carbonate by taking the ammonium chloride produced in the Solvay process and converting it initially to a metal chloride and converting the metal chloride to chlorine by a fused salt electrolysis.

2. Description of the Prior Art

Most of the chlorine produced in the United States is generated from the electrolytic oxidation of sodium chloride (brine) solutions. The electrolysis of sodium chloride solutions produces sodium hydroxide, chlorine and hydrogen. This reaction is, of course, the basis of the chlor-alkali industry. The electrical energy consumed by this reaction accounts for about one-fourth the total energy used by the electrochemical industry and the latter accounts for about 7% of the total electrical energy generated in the United States. Diaphragm cells are used for about 80% of the present chlor-alkali production. The graphite anodes used in these cells suffer the disadvantage that they are gradually consumed in the electrolytic process. Dimensionally stable anodes are presently replacing graphite anodes but suffer from the disadvantage of being very expensive. Moreover, improvements in the chlor-alkali electrolysis over the past ten years have only resulted in a drop in the electrical requirements of from 4.1 to 3.8 volts or from 1.4 to 1.3 kwh/lb of chlorine.

The Solvay process has long been utilized to produce sodium carbonate. In the process, ammonium chloride is reacted with calcium oxide to produce calcium chloride, ammonia and water. Calcium chloride is the only by-product of the Solvay process. It is a compound of limited commercial importance, however, and thus substantial amounts must be disposed of thereby resulting in environmental problems.

OBJECTS AND BRIEF DESCRIPTION OF THE INVENTION

It is an object of the invention to produce chlorine from ammonium chloride by a fused salt electrolysis.

Another object of the invention is to produce chlorine from ammonium chloride obtained from the Solvay process.

Another object of the invention is to produce chlorine at a much lower electrical requirement than that utilized by the electrolysis of a sodium chloride solution.

Another object of the invention is to modify the Solvay process to eliminate the production of calcium chloride.

Yet another object of the invention is to integrate the Solvay process with a fused salt electrolysis to produce chlorine and sodium carbonate.

A further object of the invention is to produce chlorine by an electrolytic process which does not require a dimensionally stable anode.

I have found that these and other objects are achieved by a process for producing chlorine which comprises heating ammonium chloride to a temperature sufficient to cause vaporization, contacting said vapors with a metal selected from the group of cadmium, tin and zinc wherein a metal chloride is formed, and electrolyzing the metal chloride in the presence of a fused salt electrolyte, whereby chlorine and the free metal are produced.

The above objects are also achieved by an integrated process for producing chlorine and sodium carbonate which comprises the steps of heating calcium carbonate to produce calcium oxide and carbon dioxide; contacting the carbon dioxide with water, ammonia and sodium chloride to produce sodium bicarbonate and ammonium chloride, heating the sodium bicarbonate to produce water, carbon dioxide and sodium carbonate, heating the ammonium chloride to a temperature sufficient to cause vaporization; contacting the vapors with a metal selected from the group consisting of cadmium, tin and zinc to produce a metal chloride, ammonia and hydrogen; electrolyzing the metal chloride in the presence of a fused salt electrolyte to produce a metal and chlorine; recycling the ammonia and hydrogen produced with the metal chloride; and burning said hydrogen to obtain the heat required in the process.

In the process according to the invention, ammonium chloride is used as a reactant in the production of chlorine rather than being reacted with calcium oxide to produce calcium chloride as in the Solvay process. All of the products are either commercially useful (sodium carbonate, calcium oxide and chlorine), recyclable in the process (ammonia); burned to help meet the heat requirement or are non-polluting (carbon dioxide).

DETAILED DESCRIPTION OF THE INVENTION

The Solvay soda ash process can be represented by the following equations:

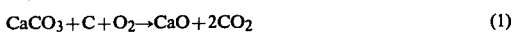

$$CaCO_3 + C + O_2 \rightarrow CaO + 2CO_2 \tag{1}$$

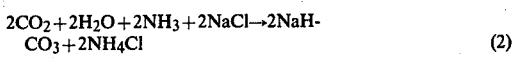

$$2CO_2 + 2H_2O + 2NH_3 + 2NaCl \rightarrow 2NaHCO_3 + 2NH_4Cl \tag{2}$$

$$2NaHCO_3 \rightarrow H_2O + CO_2 + Na_2CO_3 \tag{3}$$

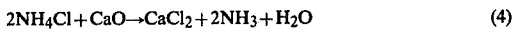

$$2NH_4Cl + CaO \rightarrow CaCl_2 + 2NH_3 + H_2O \tag{4}$$

Reaction 2 represents the chloride-carbonate exchange in which chloride ion from salt is transferred to ammonia; reaction 4 represents the recovery of ammonia for recycling in the process. The process is energy intensive and is economical today only if special measures are not required to dispose of the calcium chloride. Inasmuch as nearly ten times more tonnage of this compound is produced than can be absorbed by the market, a serious disposal problem leading to environmental pollution is presented.

In the subject invention ammonium chloride is not converted to calcium chloride and thus reaction 4 above is eliminated. Rather, ammonium chloride serves as an economical and readily available source of chlorine. In essence, sodium chloride and limestone are converted to sodium carbonate (soda ash), chlorine, calcium oxide (lime) and hydrogen.

The conversion of ammonium chloride to chlorine is accomplished by a fused salt electrolysis. A metal, M, is first reacted with vaporized ammonium chloride according to the overall reaction

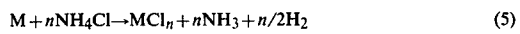

$$M + nNH_4Cl \rightarrow MCl_n + nNH_3 + n/2 H_2 \tag{5}$$

and the ammonia recovered is recycled. The metal, M, is recovered for recycling by elecyrolyzing the metal chloride, MCl$_n$ in a fused salt electrolyte and at the same time chlorine is produced. The hydrogen may be burned to provide the heat required in the process of producing chlorine.

An essential feature of the invention is the selection of an appropriate metal, M. While the electrolysis of brine produces both chlorine and sodium hydroxide, the present electrolysis produces only chlorine and thus a metal chloride must be selected which can be electrolyzed below 1.9 volts, including ohmic losses. In addition to this voltage limitation, the following additional criteria must be met.

1. Chlorination temperature: ammonium chloride dissociates into ammonia and hydrogen chloride when vaporized. Decomposition occurs at temperatures above about 300° C. and a total pressure of two atmospheres, partial pressure of each compound one atmosphere, is developed at 362° C. For efficient chlorination, the metal is preferably molten at or below this temperature.

2. Gibbs energy change: on the assumption that the reaction rate is rapid enough to achieve equilibrium in the chlorinator, it is necessary that the Gibbs energy change for the reaction be $\leq -20$ kJ/mol in order to convert 99% of the metal.

3. Metal/Metal chloride solubility: in order to minimize possible uncontrolable parasitic side reactions in the electrolysis cell the metal solubility in the fused salt should be under 1%.

4. The metal chloride or a eutectic with NaCl or KCl must be molten below about 350° C.

An inspection of the data available to Delimarskii et al "Electrochemistry of Fused Salts", (Sigma Press, Washington, D.C., 1961), JANAF Tables of Thermodynamic Values and Bureau of Standards Bulletin 500, and Janz, "Molten Salts Handbook", (Academic Press, New York, 1967), reveals that only three metals, cadmium, tin and zinc, meet most of the above cited requirements. These results are summarized in the following Table.

chloride, the metal halide having a single valence state and decomposition potential greater than the decomposition potential for stannous chloride. The preferred mixture is NaCl.ZnCl$_2$ eutectic because of its low cost, low vapor pressure and low density.

The chlorine-graphite electrode is preferred since it is known to be reversible, demonstrates no overpotential and the decomposition potentials of metal chlorides in fused salts are very close to the thermodynamic value.

The electrolysis of stannous chloride in the fused salt can occur at temperatures of from about 265° to 365° C. or the temperature of the tin chlorination reaction. The preferred embodiment of the electrolysis cell orients the graphite electrodes in the horizontal plane so as to avoid mixing from density gradients. The cathode, being the bottom electrode, is maintained at ground potential and will have channels to conduct the molten tin to a sump for circulation to the chlorinator. The molten stannous chloride will be introduced into the electrolysis cell through ducts traversing the length of the cathode and at a rate equal to the rate of decomposition by electrolysis. The upper electrode, being the anode, will be maintained at the required positive potential to effect the electrolysis. This electrode will have openings appropriately oriented to withdraw the chlorine gas as it is formed. The cell may or may not contain a separator of a composition which does not react with the constituents at the operating temperature but which prevents or reduces the diffusion of stannous chloride into the anode space yet permits the diffusion of chloride into the anode space.

It is preferred that the process according to the invention occur continuously. Ammonium chloride which is recovered from the Solvay process is dried, preheated with heat derived from the ammonia and hydrogen off-gases and fed to the bottom of a vertical reaction vessel. The ammonium chloride is vaporized and the vapors of hydrogen chloride and ammonia are countercurrently contacted with a descending spray of molten tin. The liquid stannous chloride formed is recovered from the bottom of the reaction vessel and gravity fed to electrolysis cells. The stannous chloride is then sub- Table 1

| Metal | Melting Temperature | | | $-(\Delta G)$, kJ/mol Chloride | Solubility of metal in its chloride at 500° C. mol % | Decomposition of metal chloride volts |
|---|---|---|---|---|---|---|
| | Metal | Metal Chloride | Eutectic with NaCl or KCL | | | |
| Cadmium | 321 | 568 | 382 | −100 | 14. | 1.4 |
| Tin | 232 | 247 | 183 | −74 | 0.003 | 1.3 |
| Zinc | 420 | 275 | 228 | −131 | 0.18 | 1.6 |

The values of Gibbs energy change are those associated with the formation of the metal chloride from the reaction of the metal with ammonium chloride vapor at 362° C.

As can be seen from the data in the Table, tin meets all the requirements and is therefore the preferred metal. Tin can be recovered electrolytically with an excellent current yield. The electrolysis of stannous chloride, however, preferably is carried out in a compartmented cell. In order to obtain chlorine with no loss of yield, the stannous chloride must be kept out of the anode compartment during electrolysis as otherwise the subsequent parasitic reaction would consume the product.

The supporting electrolyte can be a eutectic mixture of a metal halide with potassium chloride or sodium jected to a fused salt electrolysis. The molten tin formed is recycled to the chlorinator while chlorine is recovered and fed to a storage vessel.

The ammonia generated by the reaction of molten tin with ammonium chloride vapors is recycled to the Solvay scrubber for re-use in the Solvay process and the hydrogen generated by the same reaction is burned to obtain a fuel credit. The heat value of hydrogen per gram mol of chlorine produced is 242 kJ. Hydrogen could lower the effective cell voltage required by 0.33 volts based on an 80% boiler efficiency and a 33% generating efficiency.

The process could also be operated so that there is no thermal cycling of either tin or stannous chloride. The enthalpy changes in the off-gases, ammonia, hydrogen and chlorine, almost offsets the enthalpy change for ammonium chloride from ambient to reaction temperature. The major heat burden is the enthalpy of vaporization of ammonium chloride and the conduction losses from the chlorinator and the electrolysis cells.

The process according to the invention has several advantages over the Solvay process and the electrolysis of brine. First of all, there is a reduced electrical requirement since the actual cell voltage needed to produce chlorine lies between 1.5 to 1.7 volts, including ohmic losses. With the hydrogen credit voltage, the cell voltage would be reduced to 1.2 to 1.4 volts. Secondly, cell maintenance is simplified. Although chlorine does react with graphite to produce number of chlorinated carbon compounds, the rate is so slow that this mechanism of anode attrition is neglible. There is no need for a dimensionally stable anode as in the electrolysis of brine inasmuch as there is no oxygen in the system. Thirdly, pollution of the environment is eliminated due to the fact that calcium chloride is not produced as in the Solvay process. There is no added financial burden attached to the disposal of calcium chloride. The lime produced from the decomposition is marketed instead of being reacted with ammonium chloride. Finally, the process of the invention permits the production of chlorine independently from that of sodium hydroxide.

I claim:

1. An integrated process for producing chlorine and sodium carbonate which comprises the steps of:
   (a) heating calcium carbonate to produce calcium oxide and carbon dioxide,
   (b) contacting the carbon dioxide with water, ammonia and sodium chloride to produce sodium bicarbonate and ammonium chloride,
   (c) heating the recovered sodium bicarbonate to produce water, carbon dioxide and sodium carbonate,
   (d) heating the recovered ammonium chloride to a temperature sufficient to form a gas containing ammonia and HCl,
   (e) contacting the gas from step (d) with a molten metal selected from the group consisting of tin and zinc to produce a chloride of said metal, ammonia and hydrogen,
   (f) electrolyzing said metal chloride in the presence of a molten salt electrolyte to produce a metal and chlorine,
   (g) recycling the ammonia from step (e) to step (b) and the metal from step (f) to step (e), and
   (h) burning the hydrogen from step (e) to obtain heat required in the process.

2. A process as set forth in claim 1, wherein the calcium carbonate is heated in the presence of carbon and oxygen.

3. A process as set forth in claim 1, wherein the ammonium chloride is heated in step (d) to temperatures of at least about 330° C.

4. A process as set forth in claim 1, wherein step (e) is conducted at temperatures of at least about 330° C.

5. A process as set forth in claim 1, wherein step (e) is conducted at temperatures of from about 330° to about 365° C.

6. A process as set forth in claim 1, wherein the electrolysis is carried out at a cell voltage of from about 1.5 to 1.9 volts.

7. A process as set forth in claim 1, wherein the electrolysis is carried out using a graphite anode.

8. A process as set forth in claim 1, wherein the electrolyte is an eutectic selected from the group consisting of $NaCl.ZnCl_2$ or $NaCl.AlCl_3$.

9. A process as set forth in claim 1, wherein the metal is tin.

10. A process as set forth in claim 1, wherein the electrolysis is carried out in a compartmented cell.

11. A process as set forth in claim 1 wherein the metal is zinc.

12. A process for producing chlorine, which comprises:
   (a) heating ammonium chloride to a temperature sufficient to cause vaporization,
   (b) contacting said vapors with a molten metal selected from the group consisting of tin and zinc, wherein a chloride of said metal is formed, and
   (c) electrolyzing said metal chloride in the presence of a molten salt electrolyte whereby chlorine and the corresponding metal are produced.

13. A process as set forth in claim 12, wherein step (b) is conducted at temperatures of at least about 330° C.

14. A process as set forth in claim 12, wherein the ammonium chloride is heated in step (a) to temperatures of at least about 330° C.

15. A process as set forth in claim 14, wherein step (b) is conducted at temperatures of about 330° to about 365° C.

16. A process as set forth in claim 14, wherein the electrolysis is carried out at a cell voltage of from about 1.5 to 1.9 volts.

17. A process as set forth in claim 14, wherein the electrolysis is carried out using a graphite anode.

18. A process as set forth in claim 14, wherein the electrolyte is an eutectic selected from the group consisting of $NaCl.ZnCl_2$ or $NaCl.AlCl_3$.

19. A process as set forth in claim 14, wherein the metal is tin.

20. A process as set forth in claim 19, wherein the electrolysis is carried out in a compartmented cell.

21. A process set forth in claim 14 wherein the metal is zinc.

* * * * *